United States Patent
Morrison et al.

(10) Patent No.: US 11,108,645 B2
(45) Date of Patent: Aug. 31, 2021

(54) DEVICE INTERFACE MATCHING USING AN ARTIFICIAL NEURAL NETWORK

(71) Applicant: Hewlett Packard Enterprise Development LP, Houston, TX (US)

(72) Inventors: Corey Morrison, Houston, TX (US); Jingya Xu, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/673,276

(22) Filed: Nov. 4, 2019

(65) Prior Publication Data

US 2021/0135952 A1    May 6, 2021

(51) Int. Cl.
*H04L 12/24* (2006.01)
*G06N 3/08* (2006.01)
*G06N 20/00* (2019.01)
*G06N 3/02* (2006.01)

(52) U.S. Cl.
CPC .............. *H04L 41/16* (2013.01); *G06N 3/02* (2013.01); *G06N 3/08* (2013.01); *G06N 20/00* (2019.01); *H04L 41/0853* (2013.01); *H04L 41/0869* (2013.01); *H04L 41/14* (2013.01); *H04L 41/08* (2013.01); *H04L 41/085* (2013.01)

(58) Field of Classification Search
CPC ......... H04L 41/08; H04L 41/14; H04L 41/16; H04L 41/0869; G06N 3/08; G06N 20/00; G06N 3/02
See application file for complete search history.

(56) References Cited

U.S. PATENT DOCUMENTS

| | | | |
|---|---|---|---|
| 8,700,541 B2 | 4/2014 | Ouyang et al. | |
| 8,958,609 B2 | 2/2015 | Yasukawa et al. | |
| 10,210,246 B2 | 2/2019 | Stojanovic et al. | |
| 10,437,893 B2 | 10/2019 | Hofmann et al. | |
| 2019/0278928 A1* | 9/2019 | Rungta | G06F 9/44505 |
| 2019/0287685 A1 | 9/2019 | Wu et al. | |
| 2019/0311372 A1* | 10/2019 | Lindner | G06Q 30/01 |

* cited by examiner

*Primary Examiner* — Tom Y Chang
(74) *Attorney, Agent, or Firm* — Hewlett Packard Enterprise Patent Department

(57) ABSTRACT

An example method includes receiving first information from a first interface of a network infrastructure device. The method receives second information from a second interface of the network infrastructure device. The method compares a first value to a corresponding second value using a comparison selected, in part, due to a data type of the first value and the second value. The method determines whether the first interface and the second interface have provided matching data, based on inputting an output of the comparison into a first node of an ANN.

19 Claims, 4 Drawing Sheets

100

DEVICE INTERFACE MATCHING USING AN ARTIFICIAL NEURAL NETWORK

BACKGROUND

Often, network infrastructure devices have multiple options to access their configuration information. Each of these options, or interfaces, may independently collect information from data sources of the network infrastructure device and provide the information to a peer device. During development of new network infrastructure devices (or new software for existing network infrastructure devices), the interfaces are validated to ensure that they are providing correct information so that network administrators can rely on the information provided by each interface.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
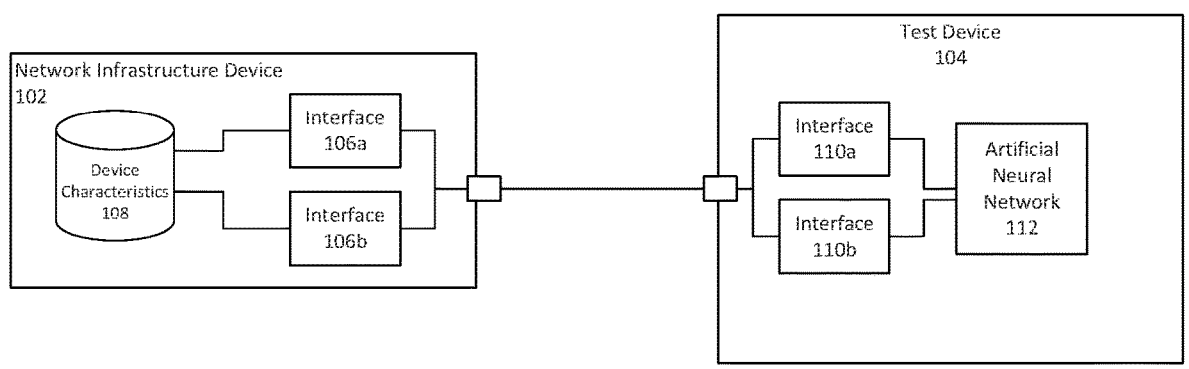
FIG. 1 illustrates an example test network including a network infrastructure device and a test device.

Certain examples have features that are in addition to or in lieu of the features illustrated in the above-referenced figures. Certain labels may be omitted from certain figures for the sake of clarity.

DETAILED DESCRIPTION

When a network infrastructure device, such as a switch, router, etc., is being developed, multiple interfaces are created to provide management access to the network infrastructure device. Often these interfaces are out-of-band, meaning that management traffic is transceived separately from data network traffic. The out-of-band management hardware in the network infrastructure device may be designed to the specifications of the Intelligent Platform Management Interface (IPMI) standard. There are many proprietary implementations of the IPMI standard, including Hewlett Packard Enterprise's iLO management interface.

There may be additional management interfaces provided by the same network infrastructure device, both in-band and out-of-band. Such interfaces may include REST APIs (e.g. RedFish), health monitors (e.g. Hewlett Packard Enterprise's Active Health System), etc. Although each interface retrieves information from the same data sources of the network infrastructure devices, the same information output from each respective interface may be different due to differences in how the information is gathered, differences in how the information is used, or other reasons. The same information may also be output from each respective interface in different ways due to a defect in one of the interfaces or a defect in the network infrastructure device. Determining which information inconsistencies are due to benign differences and which inconsistencies are due to defects is a highly manual process that often involves sifting through large amounts of data.

In some examples consistent with this disclosure, data collected from multiple interfaces of a network interface device are input into an artificial neural network (ANN), and outputs of the ANN indicate whether differences between corresponding values collected across the multiple interfaces are due to benign differences or due to defects. Different values collected from an interface may be of different datatypes, and each datatype may be compared in a different way. For example, an integer value may be compared using a difference comparison, and a device name value may be compared using a fuzzy string comparison.

The results of the comparison are input into input nodes of the ANN, which are weighted using training data. The training data may include information from interfaces that are known to not include defects, as well as data indicating that the interfaces do not include defects. Weights of nodes in the ANN are adjusted through backpropagation to train the ANN to properly determine whether or not the interfaces include defects. Negative training data may include information that is intentionally altered to include defects and data indicating that the interfaces do include defects. Weights of nodes in the ANN are adjusted to account for the negative training data, as well.

When actual (non-training) data is input to the ANN, the ANN outputs a match or no match decision based on the inputs. If the decision is that the interfaces match, the match decision is presented to a developer (e.g. a test engineer). If the decision is that the interfaces do not match, the no match decision is presented to the developer along with a list of the significant values contributing to the decision. In some examples, each input node weight is compared to a significance threshold, and for those which exceed the threshold, the corresponding value comparison is added to the list of significant values. The developer can then focus on the list of significant values when attempting to find and resolve any defects.

Examples of this disclosure improve the technical field of software development, specifically in the subfield of developing management interfaces for network infrastructure devices. The technical improvements are achieved in test devices, such as developers' computers, lab test servers, and other testing equipment used when developing network infrastructure devices. Examples of this disclosure apply mathematical concepts of artificial neural networks within the technical context of verification and validation of management interface performance. Examples of this disclosure improve the ability of test devices by, among other things, detecting imperfect matches of values in test data and selecting significant contributor values to the determination of the match or non-match of data from a number of interfaces.

FIG. 1 illustrates an example test network including a network infrastructure device and a test device. Test network 100 includes network infrastructure device 102 and test device 104. Network infrastructure device 102 is under test, and test device 104 is performing the test. Network infrastructure device 102 includes interfaces 106a and 106b connected to device characteristics 108. Interfaces 106 may be hardware, software, or a combination thereof that provide read or read/write access to device characteristics 108 for management. Device characteristics 108 may be stored in a memory or may be gathered from various components of network infrastructure device 102. Certain device characteristics 108 may be static information about network infrastructure device 102 (e.g. device name, model number). Some other device characteristics 108 may be configuration information that may occasionally or frequently change about network infrastructure device 102 (e.g. firmware version, configured link speed). Certain other device characteristics 108 may be state information that may quite frequently change about network infrastructure device 102 (e.g. device power status, link status).

Likewise, test device 104 includes interfaces 110a and 110b that correspond to interfaces 106a and 106b, respectively. Test device 104 is coupled to network infrastructure device 102. In some examples, test device 104 is coupled to network infrastructure device 102 by a data cable (e.g. serial cable). In some other examples, test device 104 is coupled to network infrastructure device 102 by a network connection. In certain examples test device 104 and network infrastructure device 102 communicate in-band, meaning that they are coupled via the data network. In some other examples, test device 104 and network infrastructure device 102 communicate out-of-band, meaning that they are coupled via a means other than the data network. Interfaces 110a and 110b may be hardware and/or software configured to communicate with network infrastructure device 102 using protocols associated with interfaces 106a and 106b, respectively. Interfaces 110a and 110b may request device configuration information from interfaces 106a and 106b, and receive the device configuration information.

Interfaces 110a and 110b are coupled to artificial neural network (ANN) 112. ANN 112 may include a set of weighted, interconnected nodes arranged in layers. ANN 112 may include an input layer, one or more hidden layers, and an output layer. Interfaces 110a and 110b input values into comparisons that are used by ANN 112 to determine whether information from interfaces 110a and 110b match. In some examples, a comparator may receive values from interfaces 110a and 110b and output comparison results to input nodes of ANN 112. In some other examples, input nodes of ANN 112 receive values from interfaces 110a and 110b and determine a comparison result. Comparisons are made between values of interface 110a and corresponding values of interface 110b. As would be apparent to one having ordinary skill in the art, comparison can occur between any number of interfaces, not just two. Different values may have different data types. For example, a first value corresponding to a number of functioning network links may be an integer and a second value corresponding to a device name may be a string.

Certain values may represent configurations that can be expressed in any number of ways. For example, a device name may be expressed as "HPE SN1610E 32Gb 2p FC HBA" from a first interface 110a and as "HPE StoreFabric SN1610E 32Gb 2-port Fibre Channel Host Bus Adapt" from a second interface 110b. However, despite differences in the strings received from the first interface 110a and the second interface 110b, ANN 112 may find that the values match using a fuzzy string match comparison. Certain other values may represent configuration that can be expressed in only one way. For example, a network port count of 2 will not be expressed using a different integer. If first interface 110a returns a network port count of 2 and second interface 110b returns a network port count of 3, ANN 112 will find that the values do not match.

Input nodes of ANN 112 include weights that adjust the significance of a particular comparison based on training data. For example, if a backup battery charge status is shown as 71% on the first interface 110a and 74% on the second interface 110b, this difference may be insignificant and due to benign reasons (e.g. the first interface 110a measured the charge status before the second interface 110b). In such a scenario, ANN 112 may reduce the weight of the input node receiving the comparison of the backup battery charge status information. Thus the impact of minor differences in charge status on the match determination of ANN 112 is not significant. Since this is a reduction in significance, substantial differences (e.g. 81% versus 18%) may still significantly impact the match determination of ANN 112.

In scenarios where ANN 112 determines that there is not a match between the information of interface 110a and interface 110b, ANN 112 collects additional information to provide to the developer. Specifically, weights of the inputs nodes of ANN 112 are compared to a significance threshold. If the weight of an input node exceeds the threshold, the comparison (and the values compared) are added to a list that is reported to the developer. In some examples, this provides the developer with a short list to investigate when a defect is suspected.

Figure 2:
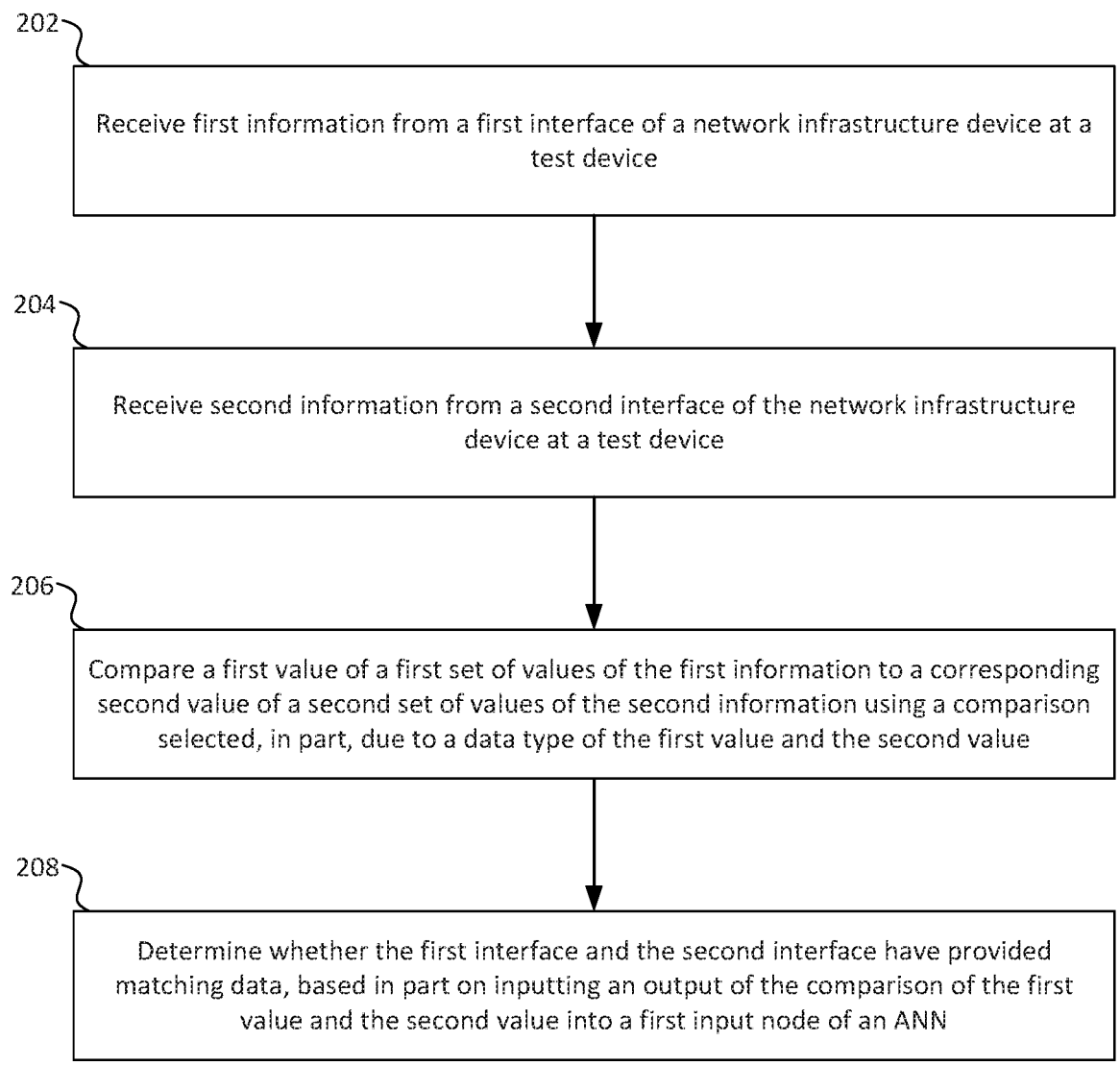
FIG. 2 is a flowchart illustrating an example method for testing interfaces of an example network infrastructure device.

FIG. 2 is a flowchart illustrating an example method for testing interfaces of an example network infrastructure device. In some examples, method 200 may be encoded as instructions in a computer readable medium and executed on a test device.

In block 202, first information is received from a first interface of a network infrastructure device at a test device. In some examples, the first information is received in response to a request being sent from the test device to the network infrastructure device. In certain examples, the first interface communicates to a corresponding interface of the test device using a certain management protocol. The certain management protocol may be an in-band protocol or an out-of-band protocol. In some examples, the first information is inserted into a dictionary of keys and values, wherein the key describes a device characteristic and the value is the device characteristic of the network infrastructure device.

In block 204, second information is received from a second interface of a network infrastructure device at a test device. In some examples, the second information is received in response to a request being sent from the test device to the network infrastructure device. In certain examples, the second interface communicates to a corresponding interface of the test device using a certain management protocol. The certain management protocol may be an in-band protocol or an out-of-band protocol. In some examples, the second information is inserted into a dictionary of keys and values, wherein the key describes a device characteristic and the value is the device characteristic of the network infrastructure device. The second interface is different from the first interface and may provide device characteristics of the network infrastructure device in a different way than the first interface.

In block 206, first value of a first set of values of the first information is compared to a corresponding second value of a second set of values of the second information using a comparison selected, in part, due to a data type of the first value and the second value. In some examples, values of the first information are paired with corresponding values of the second information. For example, a serial number of the network infrastructure device in the first information is compared to a serial number of the network infrastructure device in the second information. In some examples, when the first information and the second information are inserted into dictionaries, the insertion is done in such a way that proper mappings are made between values of the first information and values of the second information. In some examples, values provided in the first information and the second information do not correspond one-to-one to values in the dictionaries. In other words, some pre-processing of the first and second information may occur prior to inserting keys and values into the dictionaries. Despite this pre-processing, the disclosure generally describes operations as acting upon values of the first and second information to improve clarity.

Depending on the data type of the first and second values, the comparison of the first value to the second value may be different. There may be methods of comparison for each data type represented in the first and second information. For example, an integer comparison may be a difference comparison (if first value minus second value equals zero, the values match), a string comparison may be a direct string comparison (if first value matches second value character by character, the values match) or a fuzzy string comparison (if first value and second value have a fuzzy match score above a match threshold, the values match), and so on. As is implied in this example, matches can be exact (the value in the first information must exactly match the value in the second information), and matches can be fuzzy or thresholded (the similarity between the first value and the second value must be above a match threshold).

In block 208, it is determined whether the first interface and the second interface have provided matching data, based in part on inputting an output of the comparison of the first value and the second value into a first input node of an artificial neural network (ANN). In some examples, each comparison of a value of the first information to a corresponding value of the second value is input into a weighted node of an input layer. Intermediate nodes of hidden layers combine outputs from the input layer and/or from prior hidden layers and output intermediate values that are used by the output layer to generate a final determination whether the first information from the first interface matches the second information from the second interface.

In some examples, the first value is different from the second value, but the comparison of the first value to the second value indicates a match, which contributes, in part, to a determination that the first interface and the second interface have provided matching data. In some examples, the comparison of the first value to the second value indicates a match because the first value and the second value communicate the same device characteristic in different manners. In some examples, the first value and the second value are strings, and the comparison of the first value to the second value is a fuzzy string comparison that outputs a match score. The match score is compared to a match threshold. For example, if the output of the comparison of the first value and the second value is a match score of 0.802, and the match threshold is 0.8, the comparison will be considered a match. In some other examples, the match score is directly input to the input node of the ANN.

In certain examples, the comparison of the third value to the fourth value indicates no match, but an input weight of the input node associated with the comparison of the third value to the fourth value is too small for the non-match to cause the ANN to indicate that the first interface and the second interface have not provided matching data.

Figure 3:
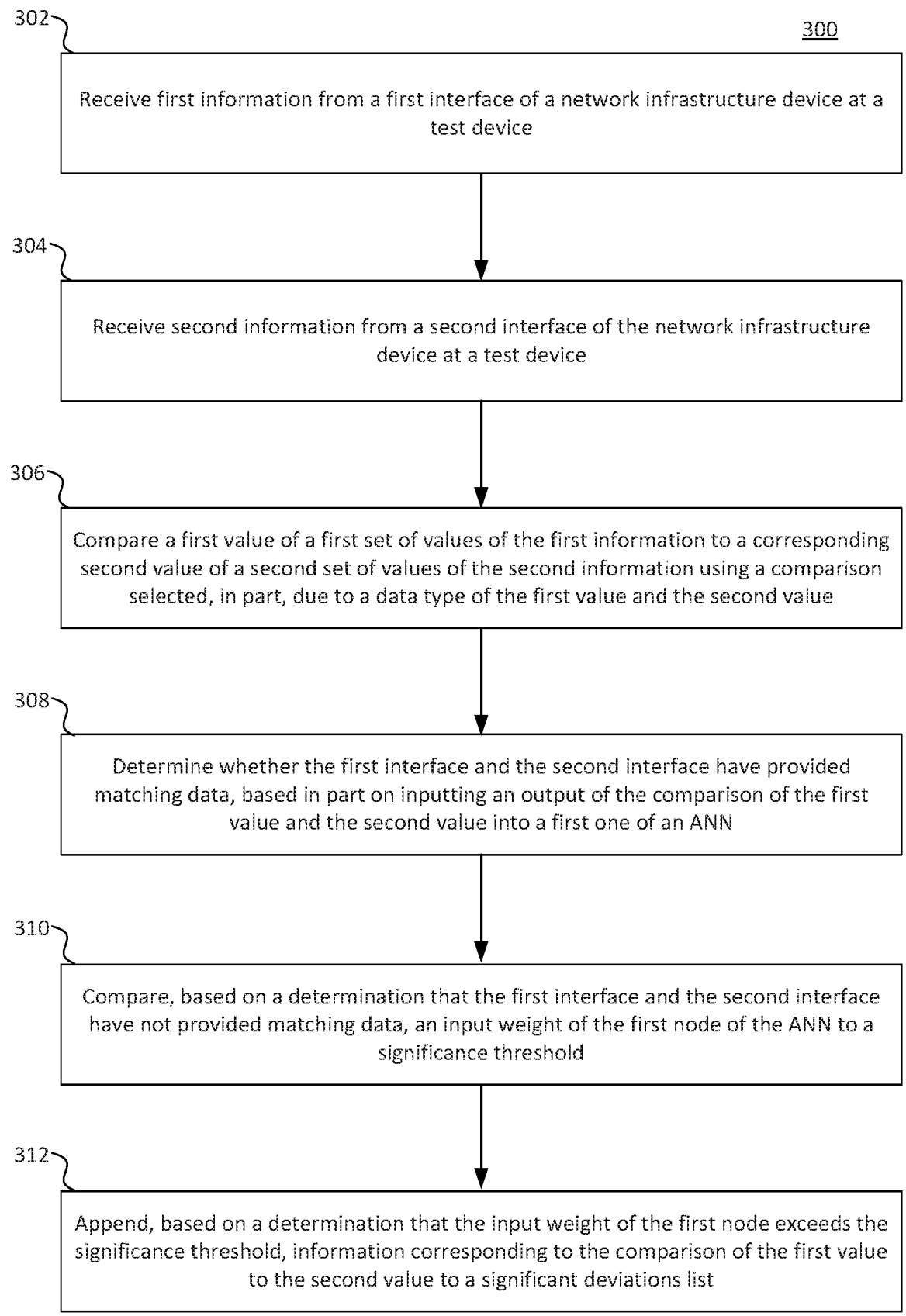
FIG. 3 is a flowchart illustrating another example method for testing interfaces of an example network infrastructure device.

FIG. 3 is a flowchart illustrating another example method for testing interfaces of an example network infrastructure device. In some examples, method 300 may be encoded as instructions in a computer readable medium and executed on a test device.

In block 302, first information is received from a first interface of a network infrastructure device at a test device. In some examples, the first information is received in response to a request being sent from the test device to the network infrastructure device. In certain examples, the first interface communicates to a corresponding interface of the test device using a certain management protocol. The certain management protocol may be an in-band protocol or an out-of-band protocol. In some examples, the first information is inserted into a dictionary of keys and values, wherein the key describes a device characteristic and the value is the device characteristic of the network infrastructure device.

In block 304, second information is received from a second interface of a network infrastructure device at a test device. In some examples, the second information is received in response to a request being sent from the test device to the network infrastructure device. In certain examples, the second interface communicates to a corresponding interface of the test device using a certain management protocol. The certain management protocol may be an in-band protocol or an out-of-band protocol. In some examples, the second information is inserted into a dictionary of keys and values, wherein the key describes a device characteristic and the value is the device characteristic of the network infrastructure device. The second interface is different from the first interface and may provide device characteristics of the network infrastructure device in a different way than the first interface.

In block 306, first value of a first set of values of the first information is compared to a corresponding second value of a second set of values of the second information using a comparison selected, in part, due to a data type of the first value and the second value. In some examples, values of the first information are paired with corresponding values of the second information. For example, a serial number of the network infrastructure device in the first information is compared to a serial number of the network infrastructure device in the second information. In some examples, when the first information and the second information are inserted into dictionaries, the insertion is done in such a way that proper mappings are made between values of the first information and values of the second information. In some examples, values provided in the first information and the second information do not correspond one-to-one to values in the dictionaries. In other words, some pre-processing of the first and second information may occur prior to inserting keys and values into the dictionaries. Despite this pre-processing, the disclosure generally describes operations as acting upon values of the first and second information to improve clarity.

Depending on the data type of the first and second values, the comparison of the first value to the second value may be different. There may be methods of comparison for each data type represented in the first and second information. For example, an integer comparison may be a difference comparison (if first value minus second value equals zero, the values match), a string comparison may be a direct string comparison (if first value matches second value character by character, the values match) or a fuzzy string comparison (if first value and second value have a fuzzy match score above a match threshold, the values match), and so on. As is implied in this example, matches can be exact (the value in the first information must exactly match the value in the second information), and matches can be fuzzy or thresholded (the similarity between the first value and the second value must be above a match threshold).

In block 308, it is determined whether the first interface and the second interface have provided matching data, based in part on inputting an output of the comparison of the first value and the second value into a first input node of an artificial neural network (ANN). In some examples, each comparison of a value of the first information to a corresponding value of the second value is input into a weighted node of an input layer. Intermediate nodes of hidden layers combine outputs from the input layer and/or from prior hidden layers and output intermediate values that are used by the output layer to generate a final determination whether the first information from the first interface matches the second information from the second interface.

In block 310, an input weight of the first node of the ANN is compared to a significance threshold, based on a determination that the first interface and the second interface have not provided matching data. In some examples, the first value and the second value are different from one another and the comparison of the first value to the second value is resultantly not a match. The comparison of the first value to the second value is then input into the first node of the ANN, which is weighted highly enough that the non-match of the comparison the first value to the second value is a significant contributor to the determination that the first interface and the second interface have not provided matching data. In certain examples, a third value of the first information is different from a fourth value of the second information, but the comparison of the third value to the fourth value is not a significant contributor to the determination that the first interface and the second interface have not provided matching data. The input node in which the comparison of the third value to the fourth value has a low weight.

In block 312, information corresponding to a comparison of a first value to a second value associated with a first node is appended to a significant deviations list based on a determination that an input weight of the first node of the input layer of nodes of the ANN exceeds the significance threshold. In some examples, additional information is included in the significant deviations list, including a measure of the influence the comparison had on the indication of no match determined by the ANN. In certain examples, related device characteristics that may be useful in determining and resolving a potential interface or device defect are provided with the comparison.

Figure 4:
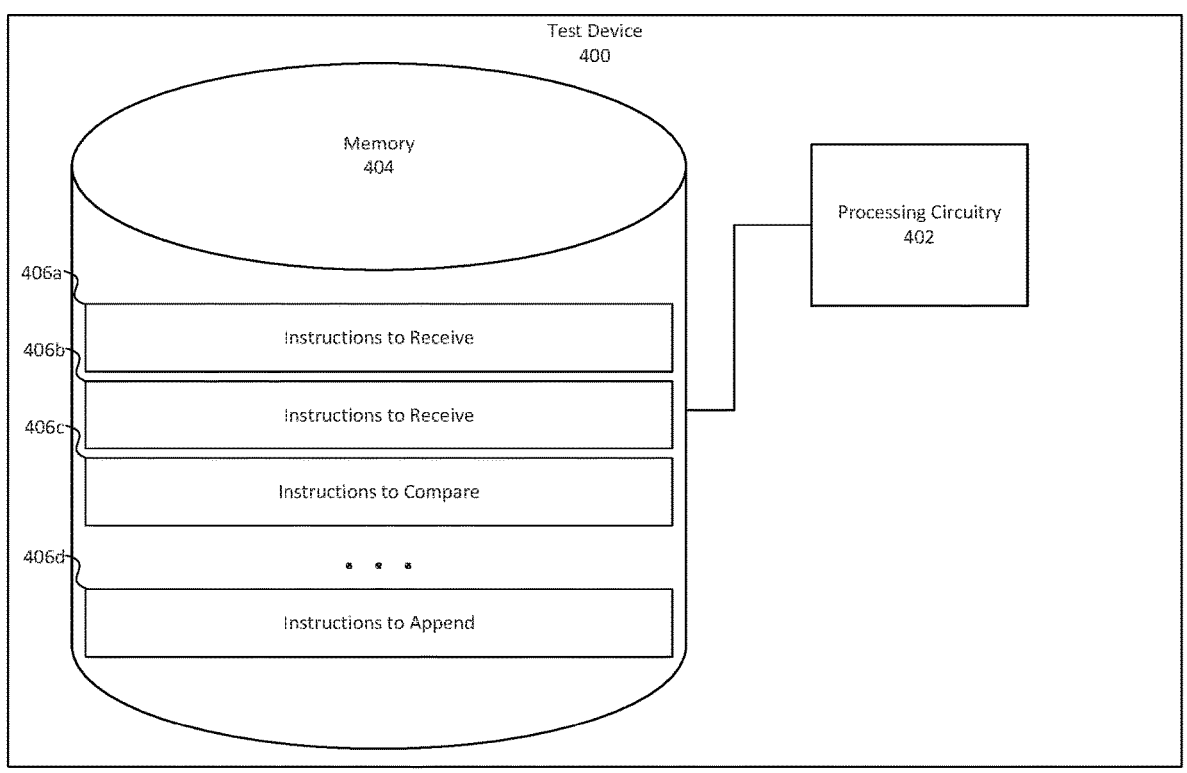
FIG. 4 is an example test device configured to test interfaces of an example network infrastructure device.

FIG. 4 is an example test device configured to test interfaces of an example network infrastructure device. Test device 400 includes processing circuitry 402 and memory 404. Memory 404 includes instructions 406 that, when executed by processing circuitry 402, cause test device 400 to perform certain tasks.

Instructions 406a cause test device 400 to receive first information from a first interface of a network infrastructure device. In some examples, the first information is received in response to a request being sent from the test device to the network infrastructure device. In certain examples, the first interface communicates to a corresponding interface of the test device using a certain management protocol. The certain management protocol may be an in-band protocol or an out-of-band protocol. In some examples, the first information is inserted into a dictionary of keys and values, wherein the key describes a device characteristic and the value is the device characteristic of the network infrastructure device.

Instructions 406b cause test device 400 to receive second information from a second interface of the network infrastructure device. In some examples, the second information is received in response to a request being sent from the test device to the network infrastructure device. In certain examples, the second interface communicates to a corresponding interface of the test device using a certain management protocol. The certain management protocol may be an in-band protocol or an out-of-band protocol. In some examples, the second information is inserted into a dictionary of keys and values, wherein the key describes a device characteristic and the value is the device characteristic of the network infrastructure device. The second interface is different from the first interface and may provide device characteristics of the network infrastructure device in a different way than the first interface.

Instructions 406c compare a first set of values of the first information to a corresponding second set of values of the second information using a comparison selected, in part, due to a data type of each respective value of the first set and value of the second set. In some examples, values of the first information are paired with corresponding values of the second information. For example, a serial number of the network infrastructure device in the first information is compared to a serial number of the network infrastructure device in the second information. In some examples, when the first information and the second information are inserted into dictionaries, the insertion is done in such a way that proper mappings are made between values of the first information and values of the second information. In some examples, values provided in the first information and the second information do not correspond one-to-one to values in the dictionaries. In other words, some pre-processing of the first and second information may occur prior to inserting keys and values into the dictionaries. Despite this pre-processing, the disclosure generally describes operations as acting upon values of the first and second information to improve clarity. In some examples, a first value of the first set and a second value of the second set are different from one another, and the comparison of the first value to the second value is a significant contributor to the determination that the first interface and the second interface have not provided matching data. In some examples, a third value of the first set and a fourth value of the second set are different from one another, but a comparison of the third value to the fourth value is not a significant contributor to the determination that the first interface and the second interface have not provided matching data. In certain examples, the third value and the fourth value are string datatype values and the comparison of the third value to the fourth value is a fuzzy string comparison resulting in a match score that is compared to a match threshold.

Depending on the data type of each of the first and second sets of values, the comparison of a certain value of the first set to a certain value of the second set may be different. There may be methods of comparison for each data type represented in the first and second information. For example, an integer comparison may be a difference comparison (if first set value minus second set value equals zero, the values match), a string comparison may be a direct string comparison (if first set value matches second set value character by character, the values match) or a fuzzy string comparison (if first set value and second set value have a fuzzy match score above a match threshold, the values match), and so on. As is implied in this example, matches can be exact (the value in the first information must exactly match the value in the second information), and matches can be fuzzy or thresholded (the similarity between the first set value and the second set value must be above a match threshold).

In some examples, additional instructions not shown in FIG. 4 determine whether the first interface and the second interface have provided matching data, based in part on inputting outputs of the comparisons of the first set and the second set into an input layer of nodes of an ANN. In some examples, each comparison of a value of the first information to a corresponding value of the second value is input into a weighted node of an input layer. Intermediate nodes of hidden layers combine outputs from the input layer and/or from prior hidden layers and output intermediate values that are used by the output layer to generate a final determination whether the first information from the first interface matches the second information from the second interface.

In some examples, additional instructions not shown in FIG. 4 compare, based on a determination that the first interface and the second interface have not provided matching data, an input weight of each of the input layer of nodes of the ANN to a significance threshold. In some examples, the first set value and the second set value are different from one another and the comparison of the first set value to the second set value is resultantly not a match. The comparison of the first set value to the second set value is then input into the first node of the ANN, which is weighted highly enough that the non-match of the comparison the first set value to the second set value is a significant contributor to the determination that the first interface and the second interface have not provided matching data. In certain examples, a first set value of the first information is different from a second set value of the second information, but the comparison of the first set value to the second set value is not a significant contributor to the determination that the first interface and the second interface have not provided matching data. The input node in which the comparison of the first set value to the second set value has a low weight.

Instructions 406d append information corresponding to a comparison of a first value to a second value associated with an input node to a significant deviations list based on a determination that an input weight of the input node of the input layer of nodes exceeds the significance threshold. In some examples, additional information is included in the significant deviations list, including a measure of the influence the comparison had on the indication of no match determined by the ANN. In certain examples, related device characteristics that may be useful in determining and resolving a potential interface or device defect are provided with the comparison.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A method, comprising:
   receiving, at a test device, first information from a first interface of a network infrastructure device;
   receiving, at the test device, second information from a second interface of the network infrastructure device, wherein the first interface and the second interface are retrieving the same information from the network infrastructure device;
comparing a first value of a first set of values of the first information to a corresponding second value of a second set of values of the second information using a comparison selected, in part, due to a data type of the first value and the second value;
determining whether the first interface and the second interface have provided matching data, based in part on inputting an output of the comparison of the first value and the second value into a first node of an artificial neural network (ANN);
comparing, based on a determination that the first interface and the second interface have not provided matching data, an input weight of the first node of the ANN to a significance threshold; and
appending, based on a determination that the input weight of the first node exceeds the significance threshold, information corresponding to the comparison of the first value to the second value to a significant deviations list, wherein the significant deviations list represents possible device defects to be investigated by a device developer.

2. The method of claim 1, wherein the first value and the second value are different from one another, and the comparison of the first value to the second value is a significant contributor to the determination that the first interface and the second interface have not provided matching data.

3. The method of claim 1, wherein a third value and a fourth value are different from one another, but a comparison of the third value to the fourth value is not a significant contributor to the determination that the first interface and the second interface have not provided matching data.

4. The method of claim 1, wherein the first information and the second information are device characteristics of the network infrastructure device.

5. The method of claim 1, wherein the first interface uses a first protocol to manage the network infrastructure device and the second interface uses a second protocol to manage the network infrastructure device.

6. The method of claim 1, wherein determining that the first interface and the second interface have provided matching data is based in part on the first value being different from the second value, and the comparison of the first value to the second value indicating a match.

7. The method of claim 6, wherein the comparison of the first value to the second value is a fuzzy string comparison comprising a match score that is compared to a match threshold.

8. The method of claim 6, wherein a failing comparison of a third value to a fourth value indicates no match, but an input weight of the failing comparison into the ANN is too small to cause the ANN to indicate that the first interface and the second interface have not provided matching data.

9. A test device, comprising:
processing circuitry; and
a memory including instructions that, when executed by the processing circuitry, cause the test device to:
receive first information from a first interface of a network infrastructure device;
receive second information from a second interface of the network infrastructure device; wherein the first interface and the second interface are retrieving the same information from the network infrastructure device;
compare a first set of values of the first information to a corresponding second set of values of the second information using a comparison selected, in part, due to a data type of each respective value of the first set and value of the second set;
determine whether the first interface and the second interface have provided matching data, based in part on inputting outputs of the comparisons of the first set and the second set into an input layer of nodes of an artificial neural network (ANN);
compare, based on a determination that the first interface and the second interface have not provided matching data, an input weight of each of the input layer of nodes of the ANN to a significance threshold;
append, based on a determination that an input weight of a first node of the input layer of nodes exceeds the significance threshold, information corresponding to a comparison of a first value to a second value associated with the first node to a significant deviations list, wherein the significant deviations list represents possible device defects to be investigated by a device developer.

10. The test device of claim 9, wherein a first value of the first set and a second value of the second set are different from one another, and the comparison of the first value to the second value is a significant contributor to the determination that the first interface and the second interface have not provided matching data.

11. The test device of claim 9, wherein a third value of the first set and a fourth value of the second set are different from one another, but a comparison of the third value to the fourth value is not a significant contributor to the determination that the first interface and the second interface have not provided matching data.

12. The test device of claim 9, wherein the first information and the second information are device characteristics of the network infrastructure device.

13. The test device of claim 9, wherein the first interface uses a first protocol to manage the network infrastructure device and the second interface uses a second protocol to manage the network infrastructure device.

14. A non-transitory, computer readable medium, comprising instructions that, when executed, cause a device to:
receive first information from a first interface of a network infrastructure device;
receive second information from a second interface of the network infrastructure device, wherein the first interface and the second interface are retrieving the same information from the network infrastructure device;
compare a first set of values of the first information to a corresponding second set of values of the second information, wherein a string datatype values subset of the first set of values are compared to a string datatype values subset of the second set of values using fuzzy string match comparisons;
determine whether the first interface and the second interface have provided matching data, based in part on inputting outputs of the comparisons of the first set and the second set into an input layer of nodes of an artificial neural network (ANN), wherein outputs of the fuzzy string match comparisons are compared to a match threshold;
compare, based on a determination that the first interface and the second interface have not provided matching data, an input weight of each of the input layer of nodes of the ANN to a significance threshold;
append, based on a determination that an input weight of an input node of the input layer of nodes exceeds the significance threshold, information corresponding to a comparison of a first value to a second value associated with the input node to a significant deviations list, wherein the significant deviations list represents possible device defects to be investigated by a device developer.

15. The computer readable medium of claim 14, wherein a first value of the first set and a second value of the second set are different from one another, and the comparison of the first value to the second value is a significant contributor to the determination that the first interface and the second interface have not provided matching data.

16. The test device of claim 14, wherein a third value of the first set and a fourth value of the second set are different from one another, but a comparison of the third value to the fourth value is not a significant contributor to the determination that the first interface and the second interface have not provided matching data.

17. The test device of claim 16, wherein the third value and the fourth value are string datatype values and the comparison of the third value to the fourth value is a fuzzy string comparison resulting in a match score that is compared to a match threshold.

18. The test device of claim 14, wherein the first information and the second information are device characteristics of the network infrastructure device.

19. The test device of claim 14, wherein the first interface uses a first protocol to manage the network infrastructure device and the second interface uses a second protocol to manage the network infrastructure device.

* * * * *